United States Patent
Zhang et al.

(10) Patent No.: US 9,231,874 B2
(45) Date of Patent: Jan. 5, 2016

(54) METHOD AND NETWORK NODE FOR HANDLING TCP TRAFFIC

(75) Inventors: Jiangtao Zhang, Shanghai (CN); Bengt Johansson, Vastra Frolunda (SE); Sten Pettersson, Torslanda (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 449 days.

(21) Appl. No.: 13/328,937

(22) Filed: Dec. 16, 2011

(65) Prior Publication Data

US 2013/0155856 A1    Jun. 20, 2013

Related U.S. Application Data

(63) Continuation of application No. PCT/EP2011/072965, filed on Dec. 15, 2011.

(51) Int. Cl.
*H04W 28/10* (2009.01)
*H04L 12/801* (2013.01)
*H04L 12/807* (2013.01)
*H04L 12/893* (2013.01)

(52) U.S. Cl.
CPC ............. *H04L 47/193* (2013.01); *H04L 47/27* (2013.01); *H04L 47/34* (2013.01); *H04L 47/14* (2013.01); *H04L 47/40* (2013.01)

(58) Field of Classification Search
None
See application file for complete search history.

(56) References Cited

U.S. PATENT DOCUMENTS

| | | | |
|---|---|---|---|
| 6,105,064 A | 8/2000 | Davis et al. | |
| 7,602,719 B2 * | 10/2009 | Speight et al. | 370/235 |
| 7,969,882 B2 * | 6/2011 | Matsunaga | 370/235 |
| 2005/0128967 A1 * | 6/2005 | Scobbie | 370/310 |
| 2005/0254420 A1 * | 11/2005 | Wager et al. | 370/230 |
| 2006/0268708 A1 * | 11/2006 | Speight et al. | 370/235 |
| 2008/0025216 A1 * | 1/2008 | Singh et al. | 370/231 |
| 2010/0110989 A1 | 5/2010 | Wu et al. | |
| 2010/0329117 A1 * | 12/2010 | Lee et al. | 370/235 |
| 2012/0099564 A1 * | 4/2012 | Bekiares et al. | 370/336 |
| 2013/0114408 A1 * | 5/2013 | Sastry et al. | 370/231 |
| 2013/0163428 A1 * | 6/2013 | Lee et al. | 370/235 |
| 2013/0170342 A1 * | 7/2013 | Alnuem | 370/230 |

OTHER PUBLICATIONS

International Search Report issued in International application No. PCT/EP2011/072965 on Sep. 13, 2012, 3 pages.
Written Opinion of the International Preliminary Examining Authority issued in International application No. PCT/EP2011/072965 on Jan. 8, 2014, 5 pages.

* cited by examiner

*Primary Examiner* — Robert C Scheibel
(74) *Attorney, Agent, or Firm* — Rothwell, Figg, Ernst & Manbeck, P.C.

(57) ABSTRACT

The embodiments herein relate to a method in a network node (110) for handling TCP traffic in a packet switched network (100). The network node (110) receives TCP traffic from a mobile node (101). The TCP traffic comprises an original window size. The network node (110) replaces the original window size with an optimized window size when the network node (110) comprises information about dropped TCP traffic and when the original window size is larger than the optimized window size. The network node (110) sends the TCP traffic comprising the optimized window size to a correspondent node (105) in the packet switched network (100) indicating an amount of TCP traffic receivable by the mobile node (101).

13 Claims, 9 Drawing Sheets

METHOD AND NETWORK NODE FOR HANDLING TCP TRAFFIC

CROSS-REFERENCE TO RELATED APPLICATION

This application is a Continuation of International Application No. PCT/EP2011/072965, filed Dec. 15, 2011, the entire contents of which is incorporated by reference herein.

TECHNICAL FIELD

Embodiments herein relate generally to a network node and a method in the network node. More particularly the embodiments herein relate to handling Transmission Control Protocol (TCP) traffic in a Packet Switched (PS) network.

BACKGROUND

A typical communications system comprises nodes, such as for example a Mobile Node (MN) corresponding via a network node to a Correspondent Node (CN). The network node may be located in a Radio Access Network (RAN) or a Core Network (CN). The communications system may be a wireline or wireless system.

The mobile node may be referred to as a user equipment and is a mobile node by which a subscriber may access services offered by an operator's core network and services outside operator's network to which the operator's RAN and core network provide access. The mobile node may be for example a communication device such as mobile telephone, cellular telephone, smart phone, tablet computer or laptop with wireless capability. The mobile node may be portable, pocket-storable, hand-held, computer-comprised, or vehicle-mounted mobile device, enabled to communicate voice and/or data, via the RAN, with another entity, such as another mobile node or a server.

The communications system may be a cellular network covering a geographical area which is divided into cell areas. Each cell area is served by a base station, e.g. a Radio Base Station (RBS), which sometimes may be referred to as e.g. evolved Node B (eNB), eNodeB, NodeB, B node, or Base Transceiver Station (BTS), depending on the technology and terminology used. The base station(s) communicate over the air interface operating on radio frequencies with the mobile node(s) within range of the base station.

In some versions of the radio access network, several base stations are typically connected, e.g. by landlines or microwave, to a Radio Network Controller (RNC), as in the third Generation (3G) of a mobile communication system, i.e. Wideband Code Division Multiple Access (WCDMA). The radio network controller supervises and coordinates various activities of the plural base stations connected thereto. In the second Generation (2G) of a mobile communication system, i.e. Global System for Mobile Communications (GSM), the base stations are connected to a Base Station Controller (BSC). The network controllers are typically connected to one or more core networks.

The network node may be for example the eNB. The correspondent node may be any node in the communication system capable of communicating with the mobile node over a TCP/Internet Protocol (IP) network. The correspondent node may be fixed or mobile. It may be a mail server, an instant massager server, a social network website, a game server, an IMS node in an IMS network etc.

The TCP and the IP are protocols of the Internet Protocol Suite (IPS). The Internet Protocol Suite is therefore also referred to as TCP/IP. The IP protocol deals with packets and the TCP is a protocol which is widely used to provide high reliable communication between hosts in an IP network. Protocols such as the Hypertext Transfer Protocol (HTTP), File Transfer Protocol (FTP), Simple Mail Transfer Protocol (SMTP), Network File System (NFS), Telnet and Secure Shell (SSH) etc. are all based on the TCP transport protocol to communicate in both a wireline network and a wireless network.

In addition to good reliability, the TCP also has a good congestion control mechanism via a window mechanism. In a connection between a client and a server, the client tells the server the amount of data it is willing to receive at one time from the server. This amount of data may be referred to as window size. Likewise, the server tells the client the amount of data it is willing to take from the client at one time. This amount of data may also be referred to as window size. A TCP receiver governs the amount of data sent by a TCP sender. The receiver returns a window update to the sender with every ACKnowledgement (ACK) indicating an allowed number of octets that the sender may transmit before receiving further permission. The ACK is a flag used in the TCP to acknowledge receipt of a packet.

In a mobile network, a mobile node usually uses TCP to surf internet, e.g. HTTP, read emails, e.g. SMTP, access social networks such as twitter, facebook etc., and online chatting, e.g. Session Initiation Protocol (SIP) or other application protocols, MSN, Skype etc. Off course, User Datagram Protocol (UDP) applications are increasing year after year with the booming of video and voice based applications. However, TCP is still the transport protocol used by the majority in the Packet Core Network (PCN) by the mobile node. It occupies nearly more than 80% of the traffic.

The third Generation Partnership Project (3GPP) Long Term Evolution (LTE) is a standard for mobile communication and may also be referred to as fourth Generation (4G). LTE comprises the Evolved Packet Core (EPC) and Evolved Universal Mobile Telecommunications System (UMTS) Terrestrial Radio Access Network (E-UTRAN). The EPC comprises several entities, elements, nodes or gateways, such as a Mobility Management Entity (MME), a Home Subscriber Server (HSS), a Serving Gateway (SGW), a Packet Data Network Gateway (PGW) and a Policy and Charging Rules Function (PCRF) Server.

The MME is responsible for of all control plane functions related to subscriber and session management. The network comprises three parts, also referred to as planes. The control plane carries control information in the network. The control plane carries control information, also referred to as signaling. The user plane carries the network's users traffic. The management plane carries the operations and administration traffic required for network management.

The HSS is a central repository of all subscriber-specific authorizations and service profiles and preferences for an Internet Protocol Multimedia Subsystem (IMS) network.

The SGW is a termination point of a packet data interface towards E-UTRAN. When mobile nodes move across the eNodeB in E-UTRAN, the SGW serves as a local mobility anchor. In other words, data packets are routed through the SGW for intra E-UTRAN mobility and mobility with other 3GPP technologies, such as 2G/GSM and 3G/UMTS.

The PGW is a termination point of the packet data interface towards the PDN.

The PCRF manages the service policy and sends Quality of Service (QoS) information for each mobile node session and accounting rule information.

The General Packet Radio Service (GPRS) Tunneling Protocol (GTP) is a group of communications protocols used to carry http://en.wikipedia.org/wiki/General_Packet_Radio_Service GPRS within for example GSM, UMTS and LTE networks. The GTP may be classified into separate sub protocols, GTP-Control (GTP-C), GTP-User plane (GTP-U) and GTP' according to their usage. The GTP-C is the control section of the GTP, and is used for signaling messages between a Serving GPRS Support Node (SGSN) and the MME, between the SGSN and the SGW, between the SGW and the PGW, and between MMEs. GTP-C comprises a GTP-C header.

A GTP-U tunnel is used to carry transport packet data units (T-PDU) and signaling messages between GTP-U Tunnel Endpoints. GTP-U comprises a GTP-U header and GTP-U payload. TCP traffic is comprised in a T-PDU of the GTP-U payload. The PDU represents a unit of data specified in the protocol of a given layer in the OSI model, which comprises protocol control information and user data. The T-PDU is the IP data transferred between the mobile node and the correspondent node. The T-PDU goes through the packet switched network via the GTP-U tunnel, which is also over an IP/UDP network.

In a LTE 4G network, the eNodeB, the MME, the PGW and the PCRF negotiate bearer QoS with control plane signaling, such as GTP-C and Diameter. Diameter is an authentication, authorization and accounting protocol. Diameter is an alternative to a Remote Authentication Dial In User Service (RADIUS) protocol.

Data transmitted on IP networks is divided into smaller units called "packets". A packet is the smallest unit of data that is transmitted and routed in an IP network, and the technology that inspects those packets on a deeper level is called Deep Packet Inspection (DPI). DPI is a network technology which inspects the content portion of traffic flowing through the network in reartime. DPI performs packet filtering by examining the data part, and possibly also the header, of the packet as it passes an inspection point, searching for protocol non-compliance, viruses, spam, intrusions or a predefined criteria to decide if the packet may pass the inspection point or if it needs to be routed to a different destination, or for the purpose of collecting statistical information. DPI may be implemented in an existing node in the network, such the GGSN or the PGW, or in a dedicated DPI node.

Quality of service (QoS) is associated with a node's ability to provide different priority to different applications, users, or data flows, or to guarantee a certain level of performance to a data flow. For example, a required bit rate, delay, jitter, packet dropping probability and/or bit error rate may be guaranteed. QoS offers a traffic regulation function referred to as policing. When a policing function identifies traffic violations it typically drops traffic. Traffic drop may also be referred to as traffic loss, packet loss or packet drop, and comprises loss of one or more data packets and occurs when the one or more packets travelling across the network fail to reach their destination. The term traffic drop will be used in the following.

QoS parameters are downloaded from the MME to the SGW to do policing on a Packet Data Protocol (PDP) bearer level. QoS parameters are the parameters that control the priority, reliability, speed and amount of traffic sending over the network. Typical QoS parameters may be throughput, bandwidth, transit delay, jitter, loss ratio, and error rate. The PGW and the eNodeB also perform policing based on a negotiated QoS. The objective of policing is to control the conformance of PDP bearer flows to their negotiated Maximum Bit Rate (MBR) QoS parameters. Policing only monitors the sending rate of all DownLink (DL) user plane traffic. UpLink (UL) traffic is not subject to policing. DL is traffic from the correspondent node to the mobile node, and UL is traffic from the mobile node to the correspondent node.

PDP is a network protocol used by packet switched networks to communicate with GPRS networks. A PDP context is the packet data connection or link between the mobile node and the correspondent node, i.e. a Public Data Network (PDN), that allows them to communicate with each other, e.g. exchange IP packets. A PDP context lasts only for the duration of a specific connection, i.e. a data session. The mobile node may have more than one PDP context activated at a time. The PDP context defines aspects such as routing, QoS, security, billing etc.

In UMTS 3G networks, the RNC, the SGSN, Gateway GPRS Support Node (GGSN) and PCRF negotiate PDP QoS with control plane signaling, such as GTP-C and Diameter, to get the MBR QoS parameters per PDP. It is not only the SGSN which performs policing functionality on the downlink user plane traffic, but also the GGSN and the RNC perform a policing functionality. The GGSN provides the user plane, forwards and routes packets. It is a gateway to external packet networks such as Internet, IMS, internal IP domain etc. A Gi interface is an IP based interface between the GGSN and the PDN either directly to the Internet or through a WAP gateway.

Policing algorithms may be implemented on a token bucket. It is a simple but efficient algorithm to perform policing. A token bucket is used to manage a device that regulates the data in a flow by checking that data transmissions conform to defined limits on bandwidth and variations in the traffic flow. When a data packet is to be checked for conformance to the defined limits, the bucket is inspected to see if it comprises sufficient tokens at that time. If so, the appropriate number of tokens, e.g. equivalent to the length of the packet in bytes, is removed from the bucket, and the data packet is passed. If there are insufficient tokens in the bucket the data packet does not conform to the defined limits, and the contents of the bucket are not changed. Non-conformant packets may be dropped.

TCP is the major traffic type in the PCN, and therefore is policing mainly performed on this type of traffic.

Considering a mobile node in a PCN network which is communicating with a correspondent node in the Internet via the TCP protocol, such as reading emails. If the subscriber traffic flows exceed an agreed service threshold, e.g. MBR, then a node in the PCN will drop packets using the policing functionality. The maximum bit rate describes the agreed upper sending rate for a PDP context, and is a value in the negotiated set of QoS parameters. Due to that the packets are dropped, more and more TCP packets are to be retransmitted over the network, which may cause network congestion, especially in the busy hours/days. Also, due to that an ACK with a window size update is sent from receiver, i.e. the mobile node, to the sender correspondent node, is slow; more packets may be dropped in the downlink traffic.

Excessive traffic over the PDP may be mostly caused by a too large window size in the ACK sent from a receiver, e.g. mobile node, to the sender, e.g. the correspondent node, in a short period of time. The consequences are that the sender aggressively sends excessive data to the receiver immediately until the receiver notifies the sender with another window size ACK.

A wireless communications network has a narrower bandwidth compared to Wireline Internet and a PCN network. The mobile node is not aware of the unmatched network speed. When the mobile node acts as a TCP receiver, it may advertise a larger window size to the sender, which may cause e.g. GPRS Supporting (GSN) nodes to do policing on this TCP traffic. This may cause network congestion, traffic drop, retransmission and packet delay problems.

Policing traffic drop will cause TCP segment re-transmission over the network from the correspondent node to the mobile node. This will cause additional packet core network overhead.

SUMMARY

An object of the embodiments herein is therefore to provide improved handling of TCP traffic in a packet switched network.

According to a first aspect, the object is achieved by a method in a network node for handling TCP traffic in a packet switched network. The network node receives TCP traffic from a mobile node. The TCP traffic comprises an original window size. The network node replaces the original window size with an optimized window size when the network node comprises information about dropped TCP traffic and when the original window size is larger than the optimized window size. The network node sends the TCP traffic comprising the optimized window size to a correspondent node in the packet switched network indicating an amount of TCP traffic receivable by the mobile node.

According to a second aspect, the object is achieved by a network node for handling TCP traffic in a packet switched network. The network node comprises a receiver configured to receive TCP traffic from a mobile node. The TCP traffic comprises an original window size. The network node comprises a replacing unit configured to replace the original window size with an optimized window size when the network node comprises information about dropped TCP traffic and when the original window size is larger than the optimized window size. The network node further comprises a transmitter which is configured to send the TCP traffic comprising the optimized window size to a correspondent node in the packet switched network indicating an amount of TCP traffic receivable by the mobile node.

Since the original window size is replaced with an optimized window size when the network node comprises information about dropped TCP traffic and when the original window size is larger than the optimized window size the correspondent node only sends an amount of TCP traffic to the mobile node which the mobile node is capable of handling, and thus the handling of TCP traffic in the packet switched network is improved.

Embodiments herein afford many advantages, of which a non-exhaustive list of examples follows:

An advantage of the embodiments herein is that they avoid downlink traffic drop in the network node policing du e to a larger TCP window size indicated by the mobile node to the correspondent node.

Another advantage is that the embodiments herein will greatly reduce the network overhead caused by the TCP segment re-transmission.

If there is no policing traffic drop and a larger window size is sent from the mobile node to the correspondent node, the larger window size will be kept. This has the advantage of not providing any impact to the transmission performance in the network.

A further advantage is that each network node may implement the embodiments herein and may perform a dynamic activation or deactivation of the embodiments. This facilitates the deployment of the embodiments herein.

The embodiments herein provide an advantage in that it may be on the PDP level of the network nodes or on the IP flow level on a DPI product.

Furthermore, an advantage of the embodiments herein is that avoiding that a too large window size sent from the mobile node to the correspondent node reduces the risk of policing traffic drop and reduces network overhead.

Another advantage of the embodiments herein is that they are applicable to a number of communications technologies, such as LTE, UMTS and GSM.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein improve the policing mechanism in a network node. The window size sent from the mobile node to the correspondent node is optimized so that unnecessary traffic drop in the downlink direction during policing is avoided. This applies for downlink traffic of TCP traffic type. The optimized window size will not be used until network nodes drop packets in the policing on a PDP context. At the first time, the mobile node advertises an original window size which is larger than the optimized window size to the correspondent node. The window size is not optimized by the network node since there has not been any previous drop of traffic. Only when the network node does the policing on the PDP context and drops traffic due to exceed MBR, it will use the optimized window size. Otherwise the network node will keep the original window size in the TCP traffic unchanged, even if it seems too bigger than indicated by the optimized window size. This is to keep the performance at an acceptable level as far as possible.

Figure 1:
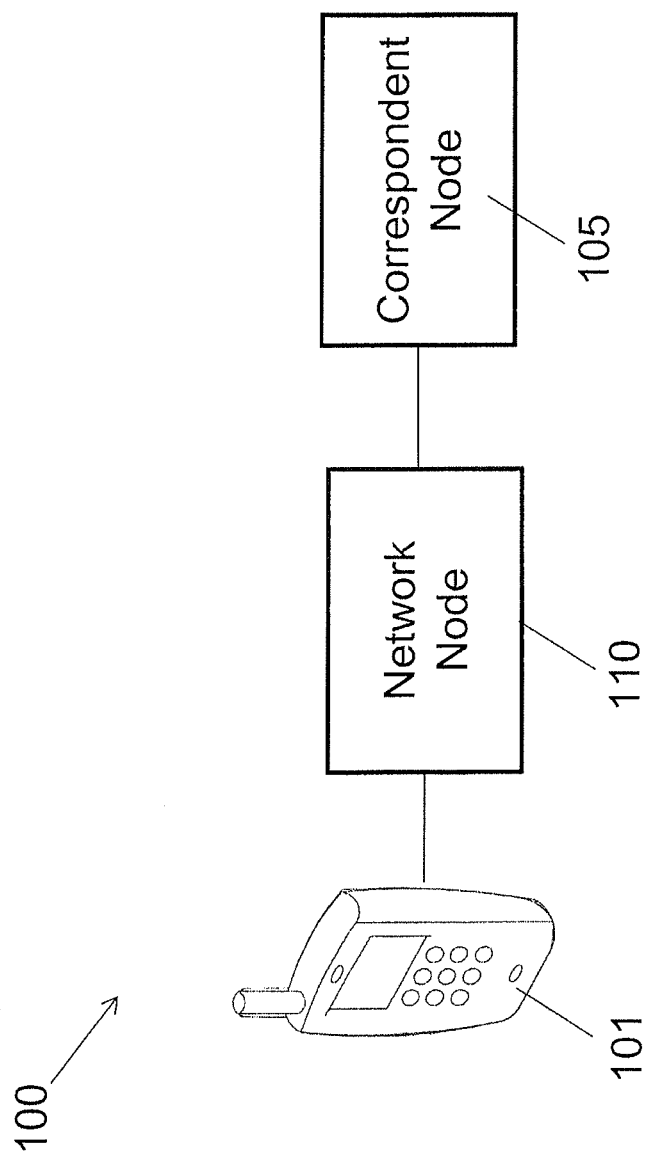
FIG. 1 is a schematic drawing illustrating embodiments of a communications network.

FIG. 1 depicts a wireless communications network 100 in which embodiments herein may be implemented. The communications network 100 may in some embodiments apply to one or more radio access technologies such as for example LTE, LTE Advanced, UMTS, GSM, WCDMA, or any other 3GPP radio access technology.

The communications network 100 comprises a mobile node 101 which communicates with a correspondent node 105 via a network node 110.

The mobile node 101 may be any suitable communication device or computational device with communication capabilities capable to communicate with the correspondent node 105, for instance but not limited to mobile phone, smart phone, personal digital assistant (PDA), tablet computer, laptop, MP3 player or portable DVD player (or similar media content devices), digital camera, or even stationary devices such as a PC. A PC may also be connected via a mobile station as the end station of the broadcasted/multicasted media. The mobile node 101 may also be an embedded communication device in e.g. electronic photo frames, cardiac surveillance equipment, intrusion or other surveillance equipment, weather data monitoring systems, vehicle, car or transport communication equipment, etc. The mobile node 101 is referred to as MN in some of the figures.

The correspondent node 105 may be referred to as a peer node, and it may be either mobile or stationary. It may be a mail server, an instant massager server, a social network website, a game server, an IMS node in an IMS network etc.

The network node 110 may be for example an eNB, a RNC, a SGW, a PGW, a SGSN, a GGSN or a DPI node.

It should be noted that the communication link between the mobile node 101, the network node 110 and the correspondent node 105 may be of any suitable kind comprising either a wired or wireless link. The link may use any suitable protocol depending on type and level of layer, e.g. as indicated by the Open Systems Interconnection (OSI) model, as understood by the person skilled in the art.

The method for handling TCP traffic in a packet switched network, according to an example of an embodiment will now be described with reference to the combined signalling diagram and flowchart depicted in FIG. 2. The network node 110 implements the policing function as described earlier. The network node 110 has not dropped any TCP traffic before entering step 201. The method comprises the following steps, which steps may as well be carried out in another suitable order than described below.

Step 201

The mobile node 101 transmits uplink TCP traffic to the network node 110 for the first time. The uplink TCP traffic comprises a TCP ACK in the TCP header. The TCP ACK message is a window advertisement message which comprises a window size to indicate the amount of outstanding data the mobile node 101 prepares to accept from the correspondent node 105. The amount of outstanding data may also be referred to as an original window size and is a field in the TCP ACK message.

The TCP traffic is comprised in the T-PDU of the GTP-U payload.

Step 202

The network node 110 inspects the uplink TCP traffic and determines that it comprises a TCP ACK message. When inspecting the original window size comprised in the TCP ACK message, the network node 110 compares the original window size with an optimized window size, and determines that the original window size is larger than the optimized window size.

The optimized windows size may be associated with a PDP QoS MBR rate, and it has a linear relationship with MBR. The optimized window size may be a fixed or variable parameter. It may be changed dynamically during the execution time. The network node 110 may decrease the optimized window size on the PDP with a step size. However the optimized window size may not be lower than a predefined lower watermark.

After determining that the original window size is larger than the optimized window size, the network node 110 investigates whether it previously has dropped any packets in the policing on a PDP context or not. If the network node 110 has not previously dropped any traffic, the network node 110 determines that no replacing of the original window size is necessary.

If the network node 110 determines that the original window size is smaller than optimized window size, the network node 110 also determines that no replacing of the original window size is necessary.

Step 203

Since, in this example, the network node 110 did not detect any previously dropped traffic, it forwards the uplink TCP traffic comprising the unchanged original window size to the correspondent node 105. It keeps the original window size in the TCP ACK unchanged even though it is larger than the optimized window size, i.e. the MBR. This is to keep the performance at the same level as far as possible.

Step 204

The correspondent node 105 receives the uplin k TCP traffic comprising the original window size from the network node 110 and responds back to the network node 110 by sending downlink TCP traffic to the network node 110.

Step 205

The network node 110 performs its policing function. The outcome of the policing function is that the downlink TCP traffic exceeds the MBR of the network node 110, and the network node 110 therefore drops the TCP traffic.

Besides the original window size, other factors may impact the policing drop traffic such as network environment, packet scheduler on the router, application type, IP segments etc. However, the original window size may be the main reason for dropping the TCP traffic.

Step 206

The network node 110 changes its state from not having dropped any TCP traffic to a state indicating that it has dropped TCP traffic. The state may be for example represented by a flag, where "0" indicates that the network node 110 has not dropped any TCP traffic and "1" indicates that the network node 110 has dropped TCP traffic.

Step 207

The mobile node 101 transmits uplink TCP traffic to the network node 110 for the second time. The uplink TCP traffic comprises the TCP ACK message. The original window size is a field in the TCP ACK message.

Step 208

The network node 110 inspects the second uplink TCP traffic and determines that it comprises a TCP ACK message. When inspecting the original window size comprised in the TCP ACK message, the network node 110 compares the original window size with the optimized window size and determines that the original window size is larger than the optimized window size. In other words, the mobile node 101 wants to sends an amount of TCP traffic which is not optimal for the performance in the communications network 100, and therefore needs to reduce its amount of TCP traffic which is better suited for the network performance. Since the network node changed its state in step 206, the network node 110 replaces the original window size with the optimized window size in the TCP ACK message in the TCP traffic.

The network node 110 is aware of the original window size advertised from the mobile node 101 to the correspondent node 105. If the advertised original window size is too large, then the network node 110 may modify this original window size to a proper value, i.e. the optimized window size. The optimized window size does not impact the TCP performance and throughput. Furthermore, the optimized window size does not cause policing TCP traffic drop on the network node 110.

In some embodiments, the policing function in the network node 110 still drops TCP traffic due to that the downlink speed exceeds the MBR even though the network node 110 uses the optimized window size in the TCP ACK to the correspondent node 105. Then, the network node 110 may decrease the optimized window size on this PDP with a step size and apply the decreased optimized window size to the TCP ACK message. If the policing function still causes TCP traffic drops, then the network node 110 may further decrease the optimized window size. However, the optimized window size may not be lower than a predefined lower watermark.

Step 209

The network node 110 forwards the uplink TCP traffic comprising the optimized window size to the correspondent node 105.

Step 210

The correspondent node 105 receives the uplin k TCP traffic comprising the optimized window size. As the correspondent node 105 now has information about the optimized window size which is smaller than the original window size, it slows down its speed for sending TCP traffic.

Figure 3:
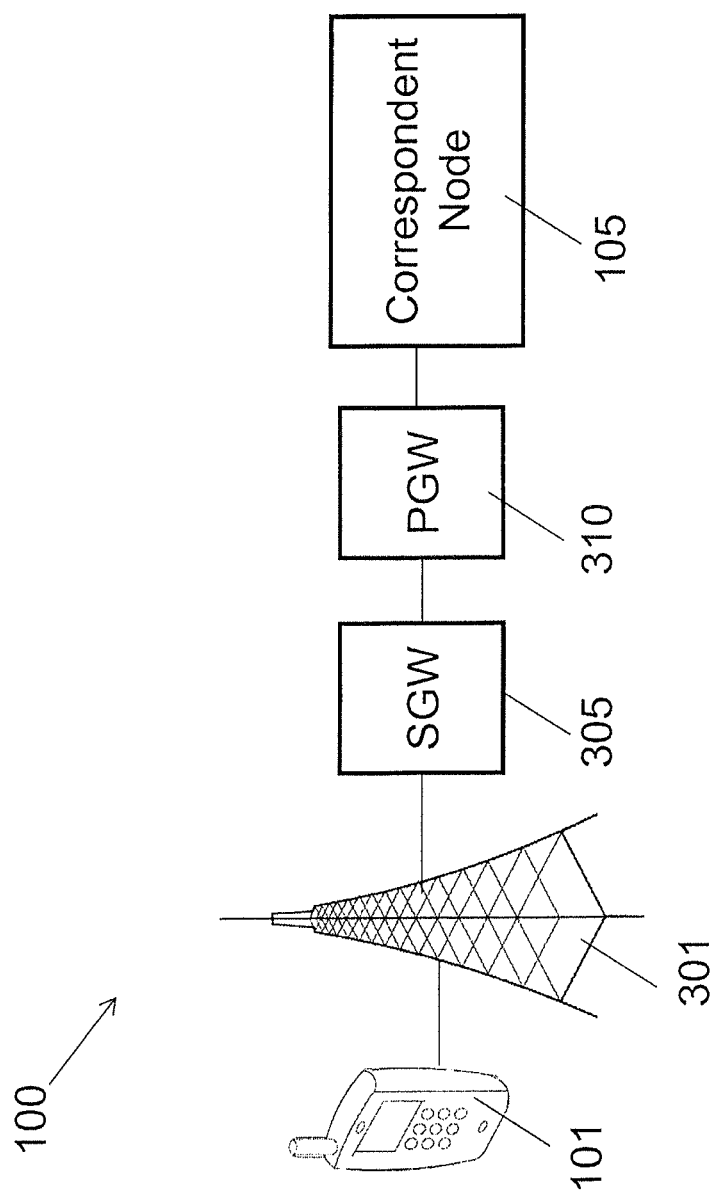
FIG. 3 is a schematic drawing illustrating embodiments of a communications network.

FIG. 3 is a block diagram illustrating an example embodiment of the communications network 100 based on LTE. The communications network 100 comprises the mobile node 101 which communicates with the eNodeB 301. The eNode 301 may also be referred to as base station, RBS, eNB, NodeB, B node, BTS, depending on the technology and terminology used. The base station 301 is connected to a core network which comprises the SGW 305 and the PGW 310. The PGW 310 is connected to the correspondent node 105 representing e.g. the internet host providing internet services to the mobile node 101. In FIG. 3, the network node 110 is exemplified by the SGW 305.

Figure 4:
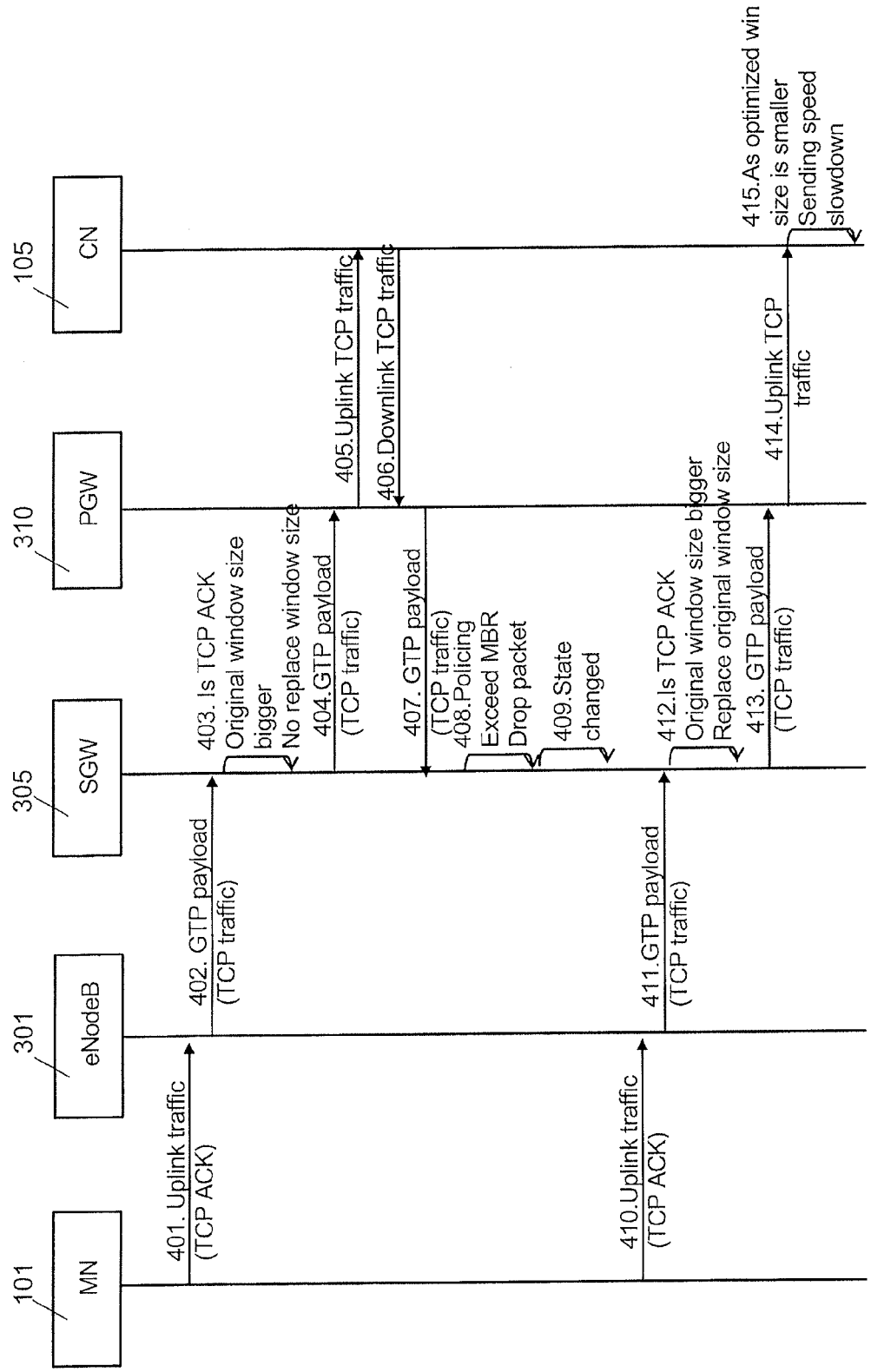
FIG. 4 is a combined schematic block diagram and flowchart depicting embodiments of a method.

The method for handling TCP traffic in a packet switched network, according to the example embodiment of the communications network 100 based on LTE illustrated in FIG. 3 will now be described with reference to the combined signalling diagram and flowchart depicted in FIG. 4. In FIG. 4, each of the eNodeB 301, the SGW 305 and the PGW 310 may be referred to as a GSN node. In the 4G LTE network each of the eNodeB 301, the SGW 305 and the PGW 310 implements the policing functionality on the downlink direction according to the bearer PDP QoS parameters which are negotiated. In this example, the network node 110 is the SGW 305. However, the embodiments may be implemented in any of the other GSN nodes or in all GSN nodes illustrated in FIG. 4. In an example where all GSN nodes in FIG. 4 implement the embodiments herein, one of the GSN nodes may be activated in order to avoid a duplicate inspection of the TCP ACK message. The SGW 305 has not dropped any TCP traffic before entering step 401. The method comprises the following steps, which steps may as well be carried out in another suitable order than described below.

Step 401

Figure 2:
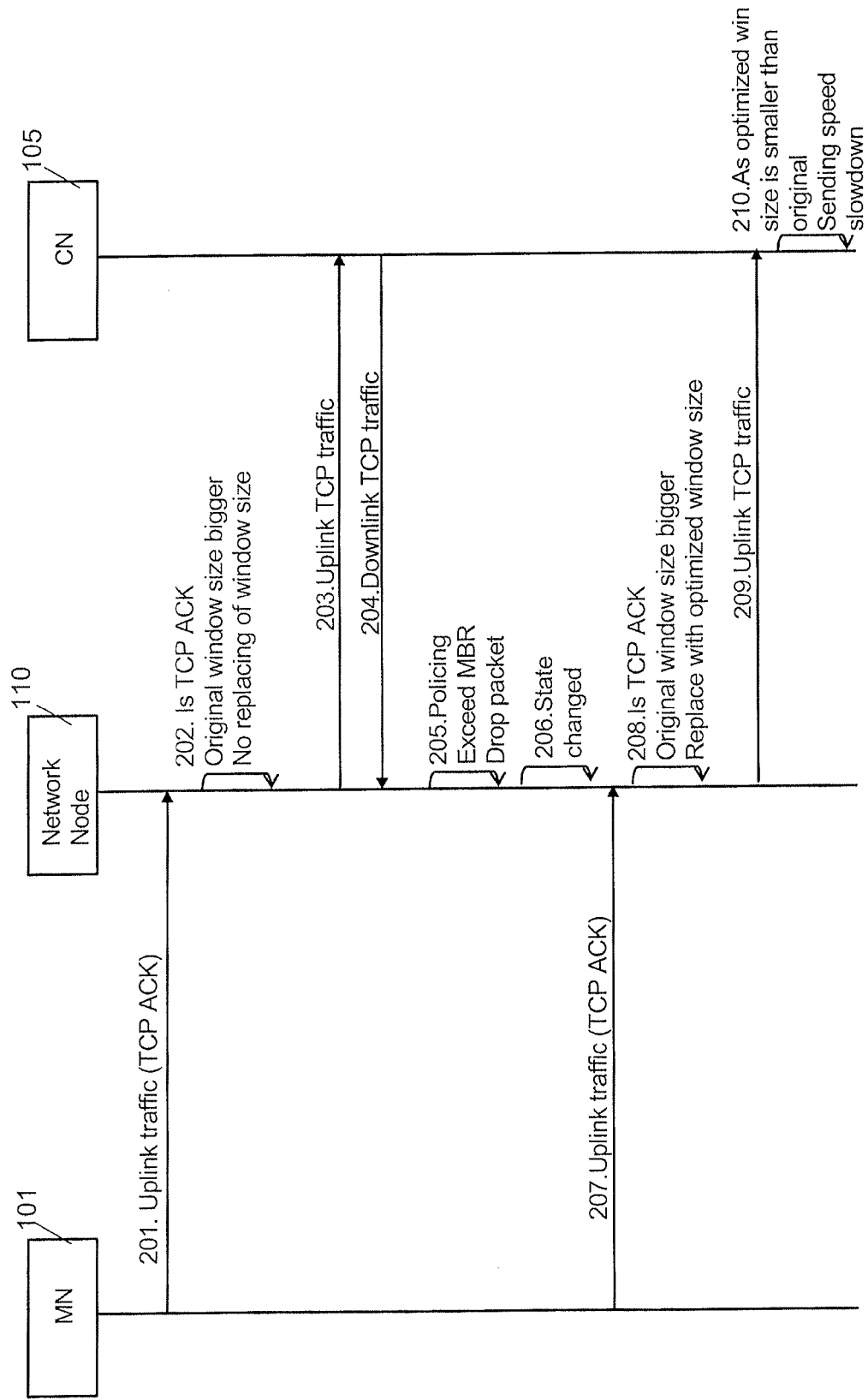
FIG. 2 is a combined schematic block diagram and flowchart depicting embodiments of a method.

This step corresponds to step 201 in FIG. 2. The mobile node 101 transmits uplink TCP traffic to the eNodeB 301 for the first time. The uplink TCP traffic comprises the TCP ACK message. The TCP ACK message comprises the original window size as a field in the TCP ACK message. The uplink TCP traffic may also be referred to as a window advertisement message.

Step 402

This step corresponds to step 201 in FIG. 2. The eNodeB 301 forwards the uplink TCP traffic using the GTP protocol, i.e. in the GTP payload, to the SGW 305.

Step 403

This step corresponds to step 202 in FIG. 2. The SGW 305 inspects the uplink TCP traffic and determines that the uplink TCP traffic comprises a TCP ACK message. If the uplink TCP traffic comprises the TCP ACK message, the SGW 305 checks if the original window size in the TCP ACK message is larger than the optimized window size in the PDP context.

When inspecting the original window size comprised in the TCP ACK message, the SGW 305 compares the original window size with the optimized window size, and determines that the original window size is larger than the optimized window size.

Figure 5:
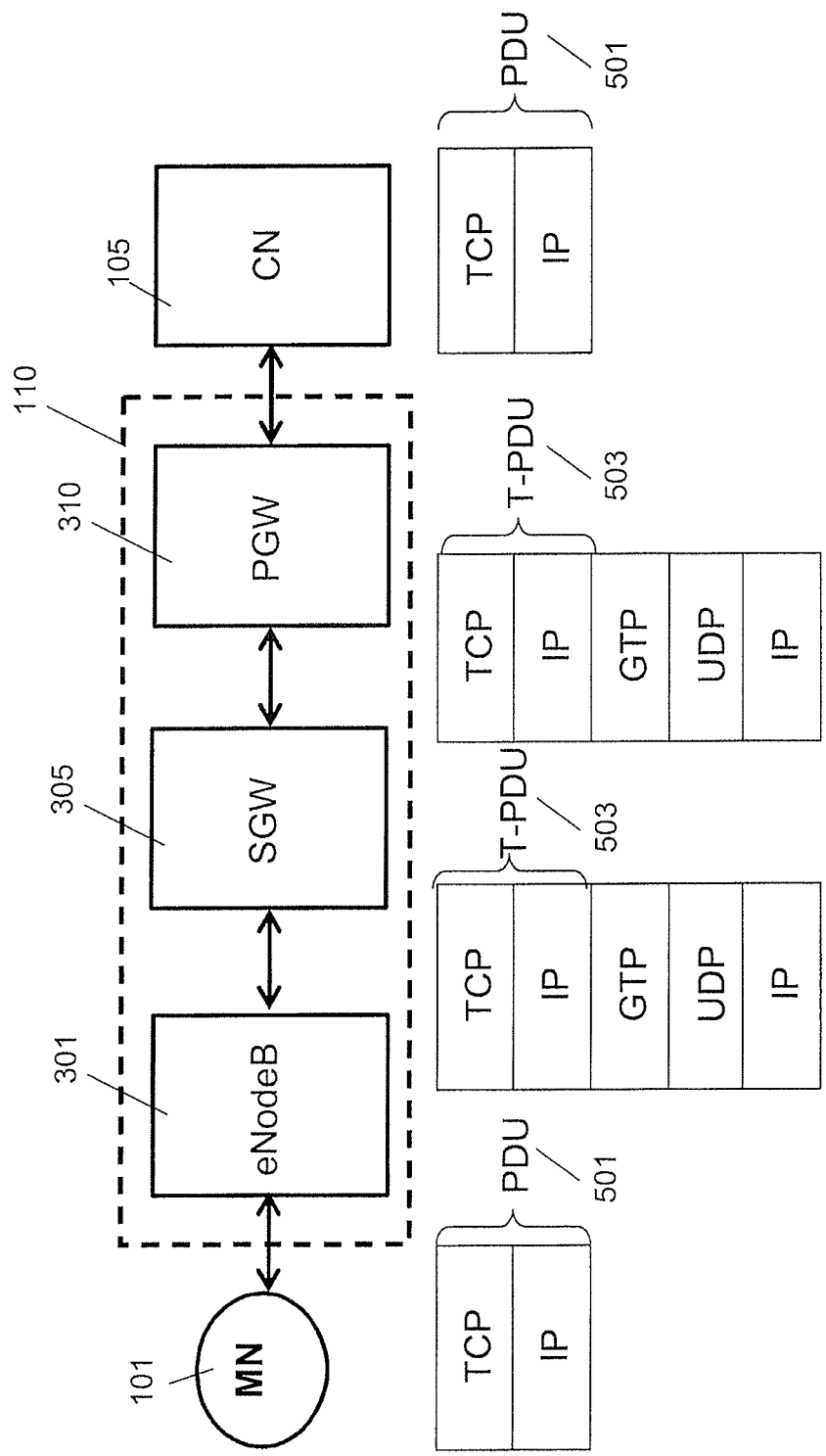
FIG. 5 is a schematic block diagram illustrating embodiments of a LTE Transport protocol stack.

As mentioned above, the SGW 305 performs policing on the downlink direction according to negotiated bearer PDP QoS parameters. In the user plane, GTP-U TCP traffic is subject to the policing and is inspected. T-PDU, which is the transport PDU, is the user traffic and is of TCP type. This is illustrated in FIG. 5 which depicts an LTE transport protocol stack. The dotted line around the eNodeB 301, the SGW 305 and the PGW 310 illustrates that they are referred to as the network node 110 in FIG. 1. IP may be referred to as a "lower level" of the LTE transport protocol stack depicted in FIG. 5. In the left most column in FIG. 5, the TCP is illustrated as being built on top of IP for the mobile node 101. The PDU 501 in the left most column in FIG. 5 comprises the IP and the TCP. The middle left column and middle right column in FIG. 5, a User Datagram Protocol (UDP) is built on top of the IP. GTP may be used with UDP or TCP. The middle left column and the middle right comprise the T-PDU 503 comprising the TCP and IP. The left most column illustrates the PDU 501 comprising the TCP and IP.

After determining that the original window size is larger than the optimized window size, the SGW 305 investigates whether it previously has dropped any traffic in the policing on a PDP context or not. If the SGW 305 has not previously dropped any traffic on the PDP due to policing, the SGW 305 determines that no replacing of the original window size is necessary, i.e. the SGW 305 takes no action.

If the SGW 305 determines that the original window size is smaller than optimized window size, the SGW 305 also determines that no replacing of the original window size is necessary.

Step 404

This step corresponds to step 203 in FIG. 2. Since the SGW 305 did not detect any previously dropped traffic, it forwards the uplink TCP traffic comprising the unchanged original window size in the GTP payload to the PGW 310. It keeps the original window size in the TCP ACK unchanged even though it is larger than the optimized window size, i.e. the MBR. This is to keep the performance at the same level as far as possible.

Step 405

This step corresponds to step 203 in FIG. 2. The PGW 310 receives the uplink TCP traffic comprising the original window size from the SGW 305 and forwards the downlink TCP traffic to the correspondent node 105.

Step 406

This step corresponds to step 204 in FIG. 2. The correspondent node 105 receives the uplink TCP traffic comprising the original window size from the PGW 310 and responds back to the PGW 310 by sending downlink TCP traffic to the PGW 310.

The downlink PDU from the correspondent node 105 to the mobile node 101 becomes the T-PDU in the packet core network in the GTP tunnel.

Step 407

This step corresponds to step 204 in FIG. 2. The PGW 310 forwards the downlink TCP traffic comprised in the GTP payload to the SGW 305.

Step 408

This step corresponds to step 205 in FIG. 2. After a while, due to a large original window size sent from the mobile node 101 to the correspondent node 106, the downlink speed exceeds the MBR for a while. The SGW 305 performs its policing function based on a QoS parameter, such as the MBR. The outcome of the policing function is that the downlink TCP traffic exceeds the MBR of the SGW 305, and the SGW 305 therefore drops the TCP traffic.

Step 409

This step corresponds to step 206 in FIG. 2. The SGW 305 changes it state from not having dropped any TCP traffic to a state indicating that it has dropped TCP traffic.

Step 410

This step corresponds to step 207 in FIG. 2. The mobile node 101 transmits uplink TCP traffic to the eNodeB 301 for the second time. The uplink TCP traffic comprises a TCP ACK message. The original window size is a field in the TCP ACK message.

Step 411

This step corresponds to step 207 in FIG. 2. The eNodeB 301 forwards the uplink TCP traffic using the GTP protocol, i.e. in the GTP payload, to the SGW 305.

Step 412

This step corresponds to step 208 in FIG. 2. The SGW 305 inspects the new uplink TCP traffic and determines that it comprises the TCP ACK message per PDP level. As mentioned above, the TCP ACK message is transmitted over the GTP-U tunnel in the packet switched network 100. When inspecting the original window size comprised in the TCP ACK message, the SGW 305 compares the original window size with the optimized window size and determines that the original window size is larger than the optimized window size. In other words, the mobile node 101 wants to sends an amount of TCP traffic which is not optimal for the performance in the communications network 100, and therefore needs to be instructed to send an optimized amount of TCP traffic which is better suited for the network performance. Since the SGW 305 changed its state in step 409 and therefore knows that traffic have been dropped due to a too large original window size sent from the mobile node 101 to the correspondent node 105, the SGW 305 replaces the original window size with the optimized window size in the TCP ACK message in the TCP traffic. In other words, the original window size in the TCP ACK message is updated to the optimized window size. The optimized window size may be predefined in the SGW 305, and is associated with the PDP QoS context.

Step 413

This step corresponds to step 209 in FIG. 2. The SGW 305 forwards the uplink TCP traffic comprising the optimized window size and comprised in the GTP payload to the PGW 310.

Step 414

This step corresponds to step 209 in FIG. 2. The PGW 310 sends the uplink TCP traffic comprising the optimized window size to the correspondent node 105.

Step 415

This step corresponds to step 210 in FIG. 2. The correspondent node 105 receives the uplink TCP traffic comprising the optimized window size. As the correspondent node 105 now has information about the optimized window size which is smaller than the original window size, it slows down its speed for sending TCP traffic.

An example of the method for handling TCP traffic in the packet switched network as exemplified in FIGS. 2 and 4, will now be described seen from the perspective of the network node 110 in FIG. 6. The method comprises the following steps, which steps may as well be carried out in another suitable order than described below.

Step 601

This step corresponds to step 201 in FIG. 2 and steps 401 and 402 in FIG. 4. The network node 110 receives uplink TCP traffic from the mobile node 101. In some embodiments, the TCP traffic is comprised in the GTP payload.

Step 602

This step corresponds to steps 202 and 208 in FIG. 2 and steps 403 and 412 in FIG. 4. The network node 110 checks whether the TCP traffic is of the T-PDU type. If the TCP traffic is not of the T-PDU type, indicated with "no" in FIG. 6, the method terminates or goes back to step 601. If the TCP traffic is of the T-PDU type, indicated with "yes" in FIG. 6, the method proceeds to step 603.

Step 603

This step corresponds to steps 202 and 208 in FIG. 2 and steps 403 and 412 in FIG. 4. When the network node 110 has determined that the TCP traffic is of T-PDU type, it checks whether the TCP traffic comprises the TCP ACK. If the TCP traffic does not comprises the TCP ACK, indicated with "no" in FIG. 6, the method terminates or goes back go step 601. If the TCP traffic comprises the TCP ACK, indicated with "yes" in FIG. 6, the method proceeds to step 604.

Step 604

This step corresponds to steps 202 and 208 in FIG. 2 and steps 403 and 412 in FIG. 4. This step may be performed before or after step 605. When the network node 110 has determined that the TCP traffic comprises the TCP ACK it compares the original window size with the optimized window size. If the result of the comparing is that the original window size is smaller than the optimized window size, indicated with "no" in FIG. 6, the method terminates or goes back to step 601. If the result of the comparing is that the original window size is larger than the optimized window size, indicated with "yes" in FIG. 6, the method proceeds to step 605.

Step 605

This step corresponds to steps 202 and 208 in FIG. 2 and steps 403 and 412 in FIG. 4. When network node 110 has determined that the original window size is larger than the optimized window size, the network node 110 proceeds with determining whether the network node 110 has ever dropped any TCP traffic due to policing. If the network node 101 has not dropped any TCP traffic due to policing, indicated with "no" in FIG. 6, the method terminates or goes back to step 601. If the network node 101 has dropped TCP traffic due to policing, the method proceeds to step 606, indicated with "yes" in FIG. 6.

Step 606

This step corresponds to step 208 in FIG. 2 and step 412 in FIG. 4. When the network node 110 has determined that it has previously dropped TCP traffic due to policing it replaces the original window size with the optimized window size and forwards the uplink TCP traffic comprising the optimized window size to the correspondent node 105.

In another example embodiment, the network node 110 may be a DPI node which implements the policing function. The DPI node is not illustrated in any of the figures. There may be DPI on the Gi interface. The DPI does not know the PDP context, it only take cares of IP flow, which is identified by 5 tuple. The DPI gets the QoS information from the PCRF via a Gx interface. The Gx interface is an on-line policy interface between the GGSN and the PCRF, and is used for provisioning service data flow based on charging rules. Since the DPI has good capability to inspect packet, it is very easy for the DPI to know the TCP ACK original window size in the TCP traffic flow from the mobile node 101 to the correspondent node 105. When the network node 110 is exemplified as a DPI, the method is the same as illustrated in FIGS. 2, 4 and 6 as described above. If the original window size is larger than the optimized window size, and there has been traffic drop due to policing on the DPI node, the optimized window size is used.

In some embodiments, if there is DPI on the Gi interface, the embodiments herein may be used on the DPI node. Then all the other nodes in the nodes in the network do not implement the embodiments herein.

If the embodiments herein are implemented in the operator's network, the embodiments herein are implemented in all network nodes 110, and the embodiments herein are activated or deactivated dynamically.

The embodiments herein may also apply to a 3G UMTS network. Each of the RNC, the SGSN and the GGSN (not shown) has the policing function to avoid that the downlink payload exceeds the MBR rate. Taking the SGSN payload as example. The SGSN performs policing to the downlink user plane GTP-U traffic. If the speed exceeds the MBR, policing will drop traffic on the PDP. According to the embodiments herein, the optimized window size in the TCP ACK sent from mobile node 101 to the correspondent node 105 is used to avoid policing traffic drop when the MBR is reached.

The embodiments herein may also apply to a 2G GSM network comprising the SGSN and GGSN.

Figure 7:
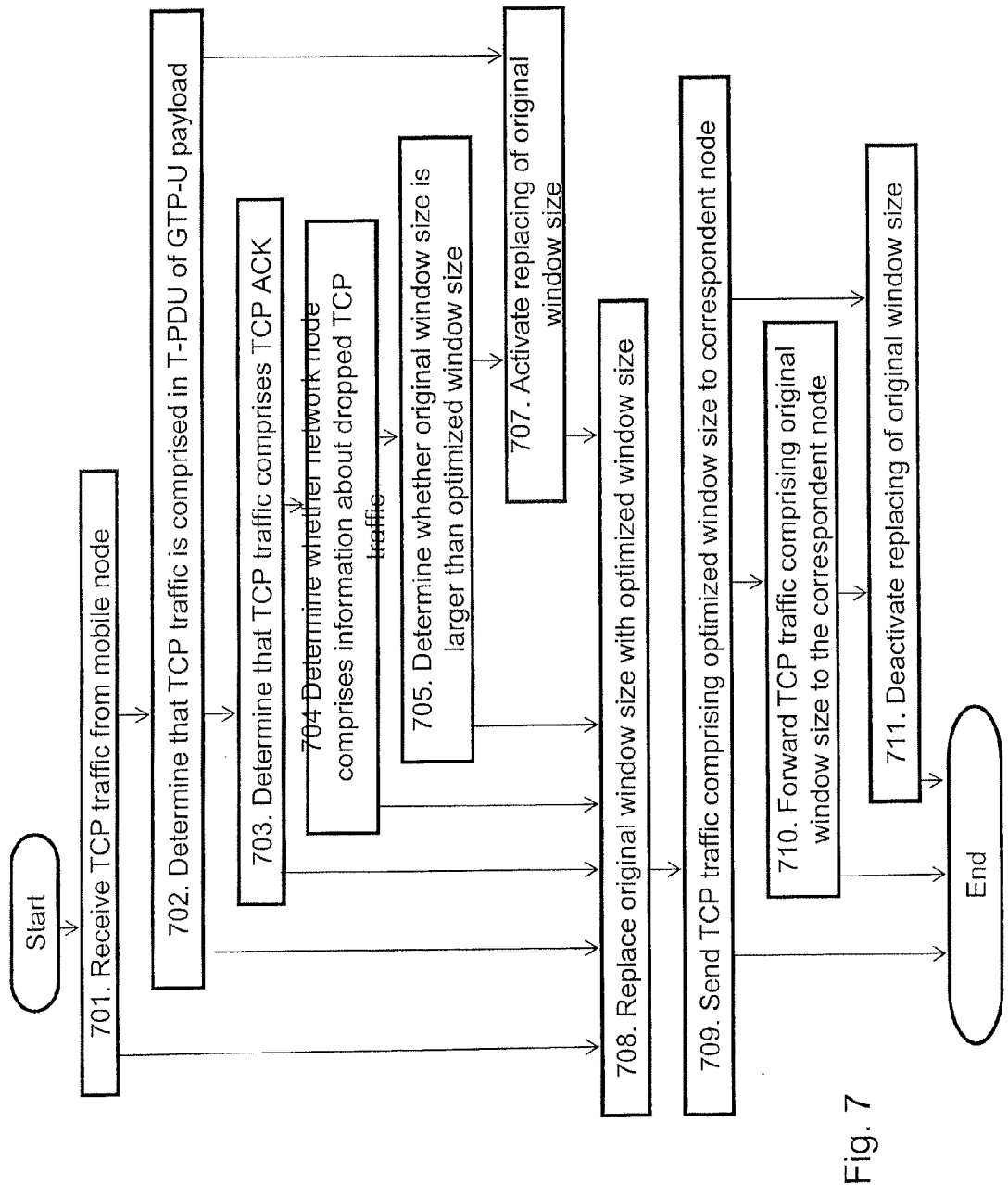
FIG. 7 is a flowchart depicting embodiments of a method in a network node.

Some embodiments of the method described above will now be described seen from the perspective of the network node 110. FIG. 7 is a flowchart describing the present method in the network node 110, for handling TCP traffic in the packet switched network 100. In some embodiment, the packet switched network 100 is based on GSM, UMTS or LTE. In some embodiments, the network node 110 is an eNB, a SGW, a PGW, a RNC, a SGSN, a GGSN or a DPI node. The method comprises the following steps to be performed by the network node 110, which steps may be taken in any suitable order:

Step 701

Figure 6:
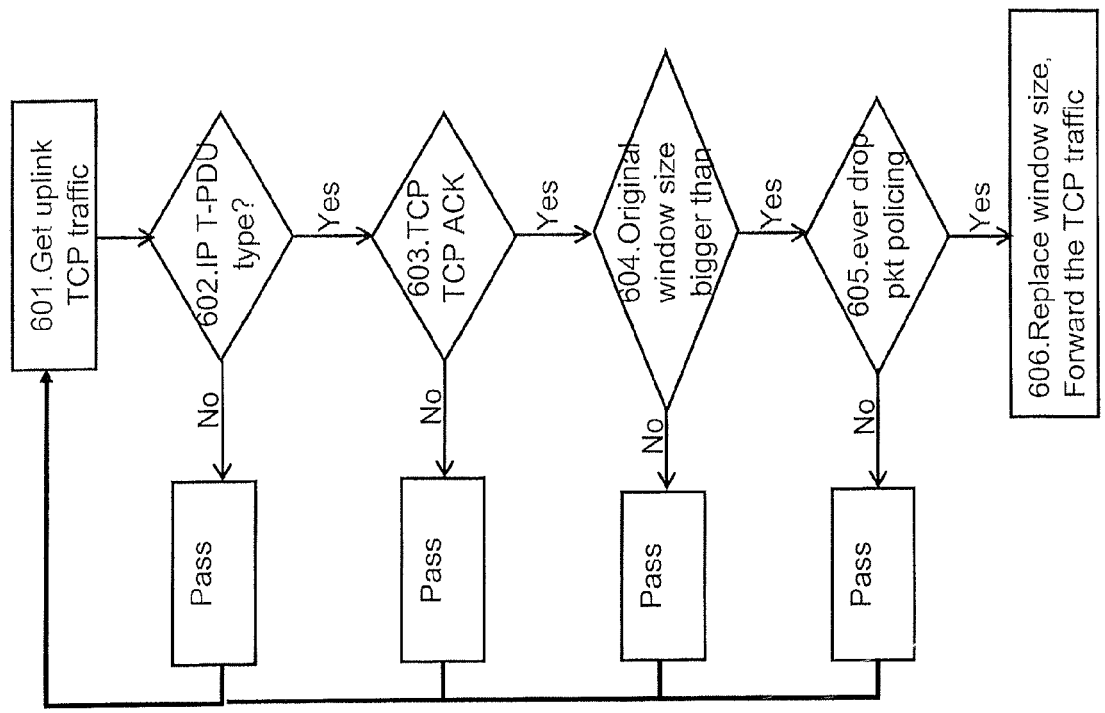
FIG. 6 is a flowchart depicting embodiments of a method.

This step corresponds to steps 201 and 207 in FIG. 2, steps 401, 402, 410 and 411 in FIG. 4 and step 601 in FIG. 6. The network node 110 receives TCP traffic from the mobile node 101. The TCP traffic comprises the original window size. The network node 110 is now ready to inspect the TCP traffic. In some embodiments, the TCP traffic comprises the TCP ACK message and the TCP ACK message comprises the original window size.

Step 702

This step corresponds to steps 202 and 208 in FIG. 2, steps 403 and 412 in FIG. 4 and step 602 in FIG. 6. In some embodiments, the network node 110 inspects the received TCP traffic and determines that the TCP traffic is comprised in the T-PDU of the GTP-U payload.

Step 703

This step corresponds to steps 202 and 208 in FIG. 2, steps 403 and 412 in FIG. 4 and step 603 in FIG. 6. In some embodiments, the network node 110 inspects the received TCP traffic and determines that the TCP traffic comprises the TCP ACK message.

Step 704

This step corresponds to steps 202 and 208 in FIG. 2, steps 403 and 412 in FIG. 4 and step 605 in FIG. 6. In some embodiments, the network node 110 inspects the received TCP traffic and determines whether the network node 110 comprises information about the dropped TCP traffic. In some embodiments, the network node 110 comprises the policing functionality, and the dropped TCP traffic is associated with the policing functionality.

Step 705

This step corresponds to steps 202 and 208 in FIG. 2, steps 403 and 412 in FIG. 4 and step 604 in FIG. 6. This step may be performed before or after step 704. In some embodiments, the network node 110 inspects the received TCP traffic and determines whether the original window size is larger than the optimized window size. In some embodiments, the optimized window size is predefined in the network node 110. In some embodiments, the optimized window size is associated with the MBR. The MBR is of the PDP or the bearer. The optimized window size may be a fixed optimized window size or a dynamic optimized window size.

Step 707

In some embodiments, the network node 110 activates the replacing of the original window size. The network node 110 may activate the replacing of the original window size upon receiving an instruction from e.g. the mobile node 101 or the correspondent node 105, or it may activate the replacing after a predetermined amount of time or at regular intervals.

Step 708

This step corresponds to step 208 in FIG. 2, step 412 in FIG. 4 and step 606 in FIG. 6. The network node 110 replaces the original window size with the optimized window size when the network node 110 comprises information about dropped TCP traffic and when the original window size is larger than the optimized window size.

Step 709

This step corresponds to step 209 in FIG. 2 and steps 413 and 414 in FIG. 4. The network node 110 sends the TCP traffic comprising the optimized window size to the correspondent node 105 in the packet switched network 100 indicating the amount of TCP traffic receivable by the mobile node 101.

Step 710

This step corresponds to step 203 in FIG. 2 and steps 404 and 405 in FIG. 4. In some embodiments, the network node 110 forwards the TCP traffic comprising the original window size to the correspondent node 105 if the network node 110 comprises no information about the dropped TCP traffic.

Step 711

In some embodiments, the network node 110 deactivates the replacing of the original window size. The network node 110 may deactivate the replacing of the original window size when there has not been any traffic drop for a long time. To be able to detect that there has not been any traffic drop for a long time, the network node 110 monitors the time between traffic drops and deactivates the replacing when the time has exceeded a predetermined threshold.

Figure 8:
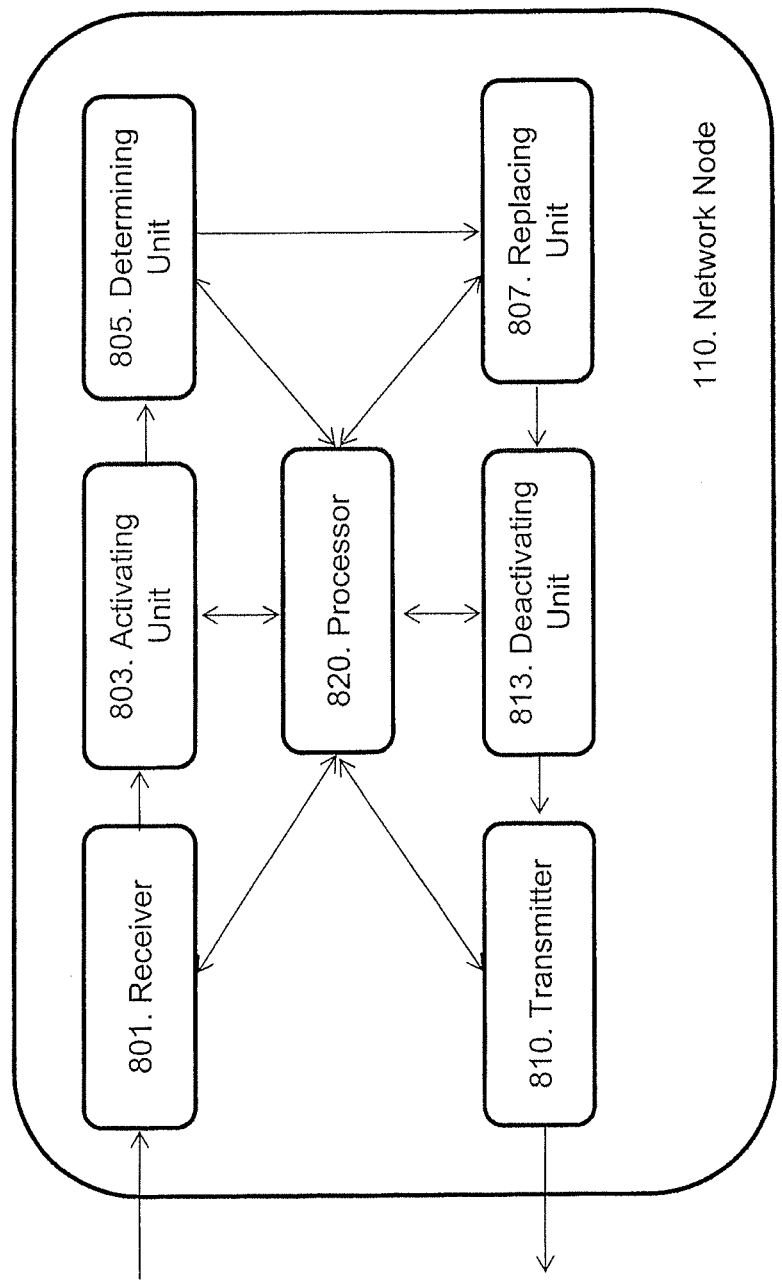
FIG. 8 is a schematic block diagram illustrating embodiments of a network node.

To perform the method steps shown in FIG. 7 for handling transmission control protocol, TCP, traffic in the packet switched network 100 the network node 110 comprises an arrangement as shown in FIG. 8. In some embodiments, the network node 110 comprises a policing functionality, and the dropped TCP traffic is associated with the policing functionality. In some embodiments, the packet switched network 100 is based on GSM, UMTS or LTE. In some embodiments, the network node 110 is the eNB, the SGW, the PGW, the RNC, the SGSN, the GGSN or the DPI node.

The network node 110 comprises a receiver 801 which is configured to receive TCP traffic from the mobile node 101. The TCP traffic comprises the original window size.

In some embodiments, the network node 110 comprises an activating unit 803 configured to activate the replacing of the original window size.

In some embodiments, the network node comprises a determining unit 805 configured to determine whether the network node 110 comprises information about the dropped TCP traffic, and to determine whether the original window size is larger than the optimized window size. In some embodiments, the determining unit 805 is further configured to determine that the TCP traffic is comprised in the T-PDU of the GTP-U payload. In some embodiments, the optimized window size is predefined in the network node 110. In some embodiments, the optimized window size is associated with the MBR. The optimized window size may be a fixed optimized window size or a dynamic optimized window size. In some embodiments, the TCP traffic comprises the TCP ACK message. The TCP ACK message comprises the original window size. In some embodiments, the determining unit 805 is further configured to determine that the TCP traffic comprises the TCP ACK message.

The network node 110 comprises a replacing unit 807 configured to replace the original window size with the optimized window size when the network node 110 comprises information about dropped TCP traffic and when the original window size is larger than the optimized window size.

The network node 110 comprises a transmitter 810 which may be configured to send the TCP traffic comprising the optimized window size to the correspondent node 105 in the packet switched network 100 indicating the amount of TCP traffic receivable by the mobile node 101. In some embodiments, the transmitter 810 is further configured to forward the TCP traffic comprising the original window size to the correspondent node if the network node 110 comprises no information about the dropped TCP traffic.

In some embodiments, the network node 110 comprises a deactivating unit 813 configured to deactivate the replacing of the original window size.

The present mechanism for handling TCP traffic in the packet switched network 100 may be implemented through one or more processors, such as a processor 820 in the network node arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code can furthermore be provided as pure program code on a server and downloaded to the network node 110 remotely.

Some example implementations of the embodiments illustrated above will now be described. Although the described solutions may be implemented in any appropriate type of communications network supporting any suitable communication standards and using any suitable components, particular embodiments of the described solutions may be implemented in an LTE network, such as that illustrated in FIG. 3. The example network may further include any additional elements suitable to support communication between the mobile node 101 and the correspondent node 105, via the network node 110.

Figure 9:
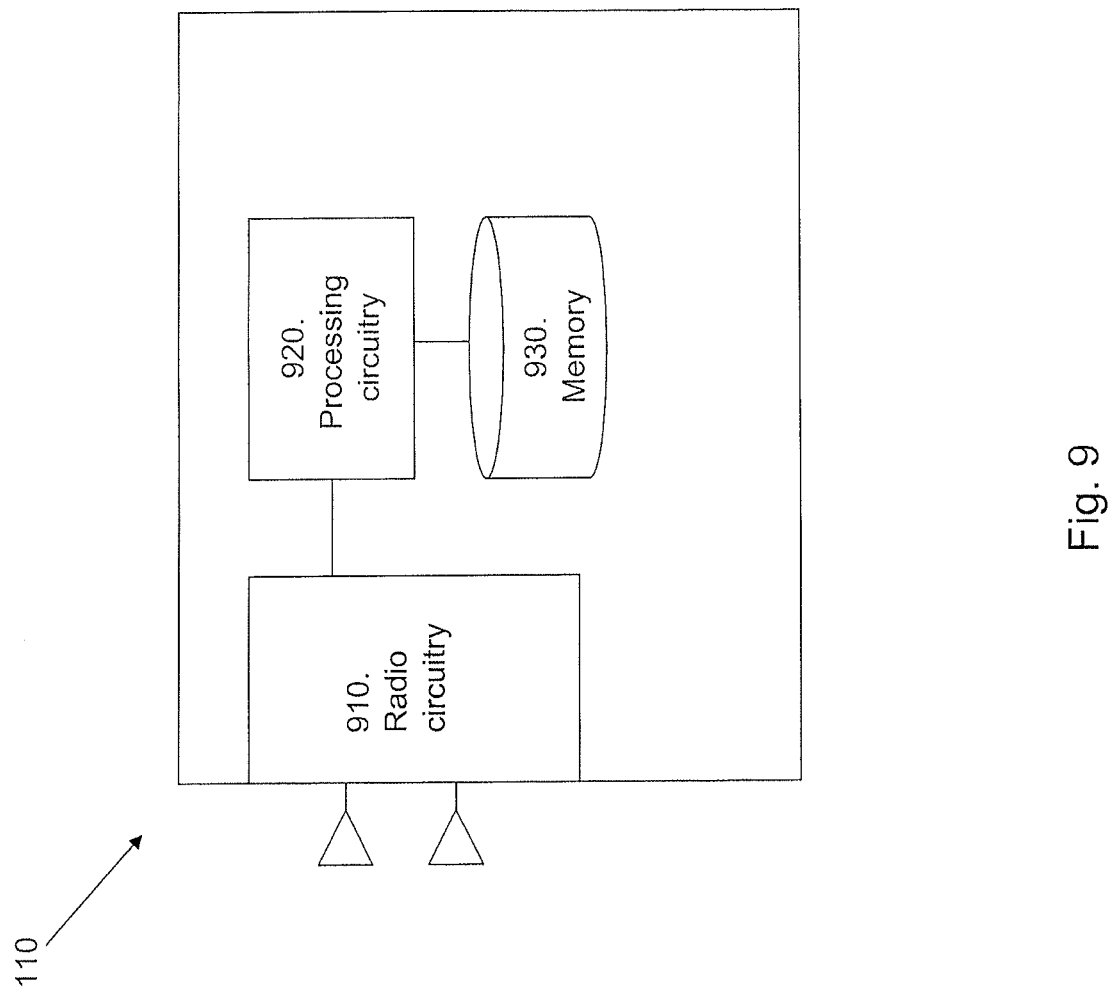
FIG. 9 is a schematic block diagram illustrating embodiments of a network node.

Although the illustrated network node 110 may represent a communication device that includes any suitable combination of hardware and/or software, this network node 110 may, in particular embodiments, represent a device such as the example network node 110 illustrated in greater detail by FIG. 9.

As shown in FIG. 9, the example network node 110 comprises processing circuitry 920, a memory 930, radio circuitry 910, and at least one antenna. The at least one antenna corresponds to the receiver 801 and the transmitter 810 illustrated in FIG. 8. The radio circuitry 910 may comprise Radio Frequency (RF) circuitry and baseband processing circuitry (not shown). In particular embodiments, some or all of the functionality described above as being provided by the network node 110 may be provided by the processing circuitry 920 executing instructions stored on a computer-readable medium, such as the memory 930 shown in FIG. 9. The processing circuitry 920 illustrated in FIG. 9 corresponds to the processor illustrated in FIG. 8. Alternative embodiments of the network node 110 may comprise additional components beyond those shown in FIG. 9 that may be responsible for providing certain aspects of the network nodes 110 functionality, including any of the functionality described above and/or any functionality necessary to support the embodiments described above.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a network node for handling transmission control protocol, TCP, traffic in a packet switched network, the method comprising:
   receiving a first general packet radio service tunneling protocol user data tunneling (GTP-U) payload comprising a first TCP acknowledgement transmitted by a mobile node, wherein the first TCP acknowledgement comprises a header containing a first original advertised window size indicating an amount of data the mobile node is willing to receive, wherein the first original advertised window size is larger than an optimized advertised window size;
   determining that no TCP segment previously received within a certain amount of time has been dropped:
   as a result of determining that no TCP segment previously received within a certain amount of time has been dropped, refraining from modifying the first TCP acknowledgement and forwarding the first TCP acknowledgement towards a corresponding node in the packet switched network;

receiving a second GTP-U payload comprising a second TCP acknowledgement transmitted by the mobile node, wherein the second TCP acknowledgement comprises a header containing a second original advertised window size indicating an amount of data the mobile node is willing to receive, wherein the second original advertised window size is larger than an optimized advertised window size;

determining that at least one TCP segment previously received within a certain amount of time has been dropped;

solely as a result of determining that at least one TCP segment previously received within a certain amount of time has been dropped, modifying the second TCP acknowledgement to create a modified TCP acknowledgement, wherein the step of modifying the second TCP acknowledgement comprises modifying the header of the second TCP acknowledgement such that the header of the second TCP acknowledgement contains the optimized advertised window size in place of the original advertised window size; and sending the modified TCP acknowledgement comprising the optimized advertised window size towards a correspondent node in the packet switched network.

2. The method according to claim 1, further comprising determining the optimized advertised window size, wherein determining the optimized advertised window size consists of calculating: A×MBR+B, wherein A is a real number greater than zero and B is a real number, and MBR is a maximum bit rate.

3. The method according to claim 1, wherein the optimized advertised window size has a linear relationship with a maximum bit rate, MBR.

4. The method according to claim 1, wherein the optimized advertised window size is a fixed optimized advertised window size or a dynamic optimized advertised window size.

5. The method according to claim 1, wherein the packet switched network is based on global system for mobile communication, GSM, universal mobile telecommunications system, UMTS, or long term evolution, LTE.

6. The method according to claim 1, wherein the network node is an evolved NodeB, eNB, a serving gateway, SGW, a packet data network gateway, PGW, a radio network controller, RNC, a serving general packet radio service support node, SGSN, a gateway general packet radio service support node, GGSN, or a deep packet inspection, DPI, node.

7. A network node for handling transmission control protocol, TCP, traffic in a packet switched network, the network node comprising:

a receiver configured to receive a plurality of general packet radio service tunneling protocol user data tunneling (GTP-U) payloads that comprise a TCP acknowledgement transmitted by a mobile node, wherein the TCP acknowledgement comprises an original advertised window size indicating an amount of data the mobile node is willing to receive that is larger than an optimized window size;

a transmitter; and one or more processors configured such that:

in response to the network node receiving one of said plurality of GTP-U payloads, the network node determines whether at least one TCP segment previously received within a certain amount of time has been dropped, and solely as a result of determining that at least one TCP segment previously received within a certain amount of time has been dropped, the network node modifies the TCP acknowledgement to create a modified TCP acknowledgement, wherein the network node is configured to modify the TCP acknowledgement by modifying the header of the TCP acknowledgement such that the header contains the optimized advertised window size in place of the original advertised window size; and the network node employs the transmitter to transmit the modified TCP acknowledgement comprising the optimized window size towards a correspondent node in the packet switched network.

8. The network node according to claim 7, wherein the network node comprises a policing functionality, and wherein the dropped TCP segment is associated with the policing functionality.

9. The network node according to claim 7, wherein the optimized advertised window size is predefined in the network node.

10. The network node according to claim 7, wherein the optimized advertised window size is associated with a maximum bit rate, MBR.

11. The network node according to claim 7, wherein the optimized advertised window size is a fixed optimized advertised window size or a dynamic optimized advertised window size.

12. The network node according to claim 7, wherein the packet switched network is based on global system for mobile communication, GSM, universal mobile telecommunications system, UMTS, or long term evolution, LTE.

13. The network node according to claim 7, wherein the network node is an evolved NodeB, eNB, a serving gateway, SGW, a packet data network gateway, PGW, a radio network controller, RNC, a serving general packet radio service support node, SGSN, a gateway general packet radio service support node, GGSN, or a deep packet inspection, DPI, node.

* * * * *

UNITED STATES PATENT AND TRADEMARK OFFICE
CERTIFICATE OF CORRECTION

| | | |
|---|---|---|
| PATENT NO. | : 9,231,874 B2 | Page 1 of 1 |
| APPLICATION NO. | : 13/328937 | |
| DATED | : January 5, 2016 | |
| INVENTOR(S) | : Zhang et al. | |

It is certified that error appears in the above-identified patent and that said Letters Patent is hereby corrected as shown below:

In the specification,

In Column 3, Line 36, delete "reartime." and insert -- real time. --, therefor.

In the claims,

In Column 16, Line 61, in Claim 1, delete "droppd:" and insert -- dropped; --, therefor.

Signed and Sealed this
Second Day of August, 2016

Michelle K. Lee
*Director of the United States Patent and Trademark Office*